(12) United States Patent
Oswald

(10) Patent No.: US 8,973,451 B2
(45) Date of Patent: Mar. 10, 2015

(54) SUBSEA ELECTRIC ACTUATORS AND LATCHES FOR THEM

(75) Inventor: Walter Oswald, Aberdeen (GB)

(73) Assignee: Aker Subsea Limited, Maidenhead, Berkshire (GB)

( * ) Notice: Subject to any disclaimer, the term of this patent is extended or adjusted under 35 U.S.C. 154(b) by 155 days.

(21) Appl. No.: 13/418,801

(22) Filed: Mar. 13, 2012

(65) Prior Publication Data

US 2012/0234117 A1  Sep. 20, 2012

(30) Foreign Application Priority Data

Mar. 16, 2011 (GB) .................. 1104394.0

(51) Int. Cl.
  *F16H 25/20* (2006.01)
  *E21B 43/12* (2006.01)
  *E21B 33/035* (2006.01)
  *E21B 41/00* (2006.01)
  *F16K 31/04* (2006.01)

(52) U.S. Cl.
  CPC ......... *E21B 33/0355* (2013.01); *E21B 41/0007* (2013.01); *F16K 31/047* (2013.01)
  USPC .............. 74/89.25; 74/89.26; 251/69; 251/71

(58) Field of Classification Search
  USPC ......... 74/89.25, 89.26; 251/66, 68, 69, 71, 74
  See application file for complete search history.

(56) References Cited

U.S. PATENT DOCUMENTS

| | | | |
|---|---|---|---|
| 4,796,708 A | 1/1989 | Lembcke | |
| 5,497,672 A | 3/1996 | Appleford et al. | |
| 5,984,260 A | 11/1999 | Rawson et al. | |
| 2003/0145667 A1 | 8/2003 | Donald et al. | |
| 2005/0247900 A1 | 11/2005 | Marsh et al. | |
| 2009/0127485 A1 | 5/2009 | Wessel et al. | |

FOREIGN PATENT DOCUMENTS

| | | | |
|---|---|---|---|
| DE | 36 07 899 | * | 10/1987 |
| EP | 0984133 | | 3/2000 |
| GB | 1141082 | | 1/1969 |
| GB | 2 383 627 A | | 7/2003 |
| WO | 2011/006519 A1 | | 1/2011 |
| WO | WO 2011/006519 | | 1/2011 |

OTHER PUBLICATIONS

Translation of DE 36 07 899, published Oct. 1987.*
Preliminary Report on Patentability and Written Opinion re PCT/GB2012/000225 mailed Nov. 28, 2013.

* cited by examiner

*Primary Examiner* — William C Joyce
(74) *Attorney, Agent, or Firm* — Nixon & Vanderhye PC

(57) ABSTRACT

A subsea electric actuator comprises an electric motor and a telescopic drive connection (8) from the motor to a drive unit (10, 11, 12) which can be moved to and fro and converts rotary motion of the connection to linear motion of an actuating stem (5). A return spring (14) is operable on the drive unit to urge the actuating stem towards a datum state. An electromagnetic latch (15) is operative when set to maintain the drive unit in a predetermined position so as to decouple the action of the return spring whereby the stem can be advanced and retracted relative to the drive unit free from the action of the return spring. De-energization of the latch allows the return spring to operate on the drive unit to return the actuating stem to the datum state. Various forms of electromagnetic latch are described.

11 Claims, 13 Drawing Sheets

SUBSEA ELECTRIC ACTUATORS AND LATCHES FOR THEM

CROSS-REFERENCE TO PRIORITY APPLICATION

This application claims priority from GB patent application No. 1104394.0 filed on 16 Mar. 2011. The entire contents of that application are hereby incorporated by reference.

FIELD OF THE INVENTION

This invention principally concerns electric actuators which are primarily intended for use in subsea installations such as process control systems.

Such actuators are used to control various devices, and particularly but not exclusively to open and close valves which themselves control the flow of fluids such as fluid hydrocarbons.

SUMMARY OF THE STATE OF THE ART

EP-0984133 discloses an actuation module in which a motor drives a rotatable socket which rotates and thereby advances and retracts a drive screw. The motor is provided with a self-contained secondary power source.

WO2002/039203 and US2006/0048602 disclose an actuator in which a drive shaft is connected to a rotating sleeve connected to a fixed ball nut which displaces axially a rotating spindle coupled to an actuating stem by a spindle head.

U.S. Pat. No. 6,595,487 discloses an actuator in which either of two motors with respective storage batteries can drive by way of a reduction gearbox an axially fixed nut which drives a valve spindle.

WO2007/027097 discloses an actuator wherein the spindle of a motor directly drives a nut which is connected to a valve spindle by an auxiliary frame which can be used to retract the valve spindle when the nut is decoupled from the valve spindle.

BACKGROUND TO THE INVENTION

Two important requirements of an electric actuator intended for use in a subsea installation are to minimise the power required for operation and to allow the actuator to be put into a predetermined state (typically one which closes a respective valve) on the occurrence of partial or complete failure of the electrical supply to a motor which drives the actuator. These two requirements may well be in conflict. More particularly, it is currently considered desirable to provide a return spring which is disposed to act to return the actuator to a datum state. A drive system which has to work against the force of the return spring consumes power unnecessarily and it is one object of the electric actuator to include the safety feature of a return (or 'fail-safe') spring and to allow normal working of the motor or motors for the actuator free from the action of the return spring.

SUMMARY OF THE INVENTION

In one aspect of the invention a subsea electric actuator comprises an electric motor, a telescopic drive connection from the motor to a drive unit which can be moved to and fro and converts rotary motion of the connection to linear motion of an operating member, a return spring operable on the drive unit to urge the operating member towards a datum state and a latch which is operative when set to maintain the drive unit in a predetermined position so as to decouple the action of the return spring on the operating member, whereby the stem can be advanced and retracted relative to the drive unit free from the action of the return spring, and operative on release to allow the return spring to operate on the drive unit to return the operating member to the datum state.

Whether a return spring is employed or not, it is desirable to provide a construction which allows working of the actuator by a motor or either one of two motors or possibly any one of more than two motors in a manner which allows the movement of the actuator, for example either by a spring or by ROV intervention, to a datum state without decoupling of the drive system.

In another aspect of the technical development therefore a subsea electric actuator comprises an electric motor, a telescopic drive connection between the motor and a drive unit which can move to and fro and includes a drive nut which couples rotary motion of the drive connection to a screw which is disposed for axial movement without rotation and is connected to an operating member.

As will be apparent from further explanation herein, practical embodiments of the electric actuator include a latch which is operative to decouple the action of a return spring on the actuator and is operative on the absence of electrical supply to the latch to release the action of the return spring. Various embodiments of such latches are described herein. However, at least some of the latches have a utility independent of the specific purpose of latching a return spring.

The invention further provides various latches for maintaining a unit (such as a drive unit as aforesaid) in a predetermined position so as to prevent movement of that unit away from that position in a given direction but to allow such movement on release of the latch.

There follows a description by way of example of a specific embodiment of an electric actuator as well as embodiments of latches which may be used in such an actuator or otherwise.

INTRODUCTION TO THE DRAWINGS

DETAILED DESCRIPTION

Figure 1:
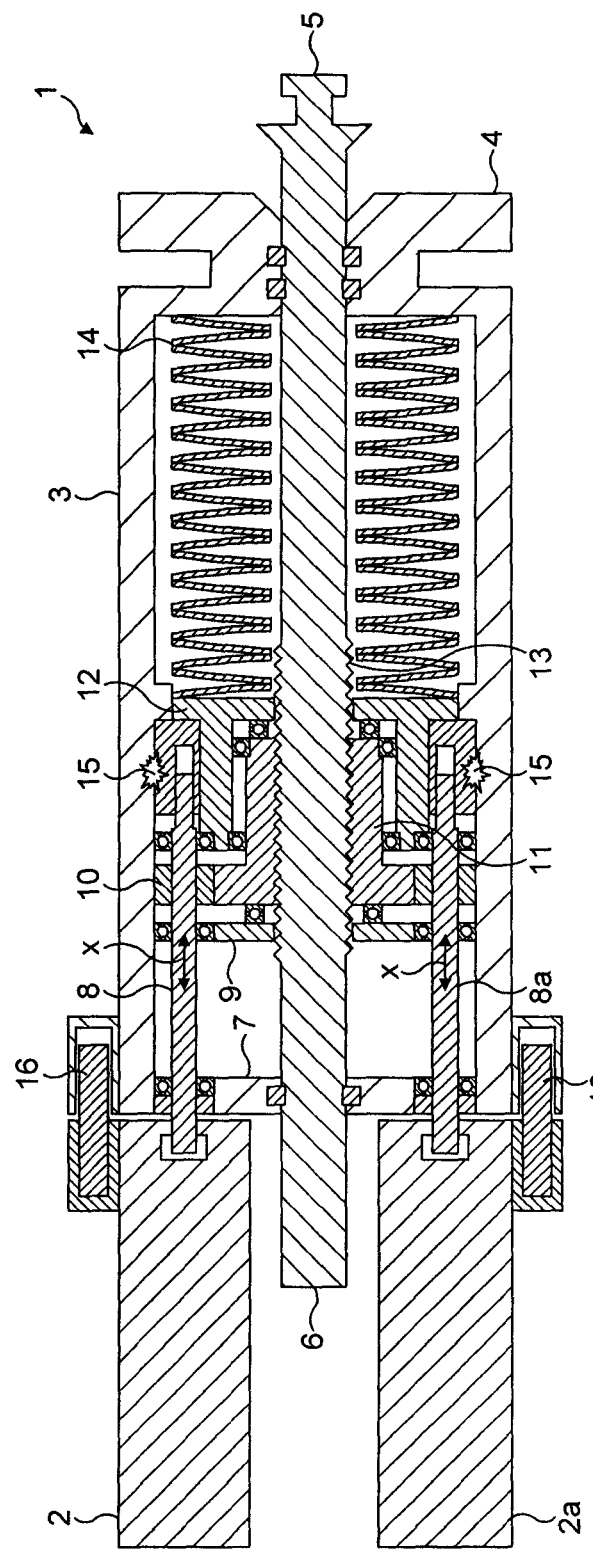
FIG. 1 is a schematic drawing of an electric actuator and associated components.

FIG. 1 is a schematic drawing of an electric actuator 1 in accordance with the inventive concepts envisaged herein.

The actuator is intended for operation by either one of dual redundant electrical devices which each comprise a storage battery, an electric motor and associated electrical components. In FIG. 1 the two devices are disposed within respective enclosures 2 and 2a disposed at one end of an enclosure 3 for the actuator. The enclosure 3 is in this example integral with a valve bonnet 4. Extending through the enclosure 3 and protruding from each end is an operating member 5 which for convenience will be termed hereinafter as the valve stem, since the actuator's primary use is in the operation of a valve.

This valve stem 5 is intended to be moved to and fro axially to operate the valve (not shown) or other device. It is shaped at its right-hand end to engage (for example) a valve gate. Its left-hand end 6 may be engaged, employing a suitable interface, by an ROV (remotely operating vehicle) whereby the ROV can operate the valve by movement of the stem 5.

A first drive shaft 8 protrudes from the actuator enclosure 3 into the motor enclosure 2 so as to be driven by the respective motor. The drive shaft 8 is supported by bearings in an end wall 7 of the enclosure 3 and an end wall 9 of a gear train casing. Beyond the wall 9 the shaft 8 drives a gear train 10 (which may comprise a pinion and a sun gear) for driving through a speed reduction a roller nut 11 which is rotatable (and supported by bearings) within a casing 12 which can move axially within the actuator enclosure 3. The roller nut 11 has an internal screw threading engaging a complementary roller screw threading 13 formed on or otherwise connected to the stem 5. The gear train 10, the nut 11 and the drive casing 12 constitute a moveable drive unit by which the rotary movement of the drive shaft is converted to linear movement of the stem 5. More complex gear trains (e.g. epicyclic) may be employed provided that the gear train, the nut and the casing can move as a unit.

In like manner, the motor within enclosure 2a is coupled to drive the roller nut by way of a second, respective drive shaft 8a which is coupled to the drive unit in the same manner as is the shaft 8. Thus either motor (or both) can drive the stem 5.

Each of the drive shafts 8 and 8a is 'telescopic', i.e. it is axially extensible and collapsible to accommodate, without loss of drive connection, movement of the drive unit and the stem 5 relative to the motor to and fro in the enclosure 3. The shaft 8 may for example and as shown in other Figures comprise a splined rod within an outer sleeve. In FIG. 1 the telescopic nature of the shafts 8 and 8a is denoted schematically by the double headed arrows X.

This embodiment includes a return, or 'fail-safe' spring 14 in order to return the actuator stem to a datum position in the event of power failure. In this example the spring 14 is disposed in the actuator enclosure 3 and bears against the casing 12 for the gear train and the roller nut. The spring 14 in this example is constituted by a stack of conical disc springs, but other forms of spring may be employed.

In order to maintain the drive unit in a predetermined position against the force of the return spring 14, and thereby to decouple the action of the return spring from the actuator stem the actuator includes an ESD (emergency shut down) latch mechanism 15. This is shown purely diagrammatically in FIG. 1. Various embodiments of a suitable latch will be described later.

The stem 5 has end stops which limit the axial movement of the valve stem in each axial direction. These stops are shown in later Figures.

Operation of the Actuator

The basic operation of the actuator shown in FIG. 1 is as follows. The roller nut is driven by way of the gear train from the shaft 8 or the shaft 8a. The stem is held (e.g. by means of splines) against rotation, and accordingly the nut 11 and the drive unit advance against the force of the return spring 14. The drive unit reaches a position in which it is latched by the latch mechanism 15 against rearward movement. Reversing the direction of rotation of the nut 11 will now drive the actuator stem forwards so as for example to open the valve. Since the action of the return spring on the stem is effectively decoupled, and the drive unit is held in position, the stem may be moved to and fro to close and open the valve without expenditure of power against the spring 14.

If however the latch mechanism is released, the spring 14 acts to force the return of the drive unit and the valve stem. The roller nut 11 may be prevented from rotating by de-energized electromechanical brakes 25, 25a (FIG. 2) on each motor. The dimensions of the enclosure and the stem need selection such that the rearward movement of the drive unit caused by the spring is sufficient to cause the stem to close the valve.

It will be noted that owing to the provision of the telescopic drive shafts the operation of the spring 14 does not require any decoupling of the drive connection between the motors 2, 2a and the stem 5.

Each of the motors may receive power by way of a respective 'wet-mate' connector 16, 16a.

The Supply and Instrumentation System

Figure 2:
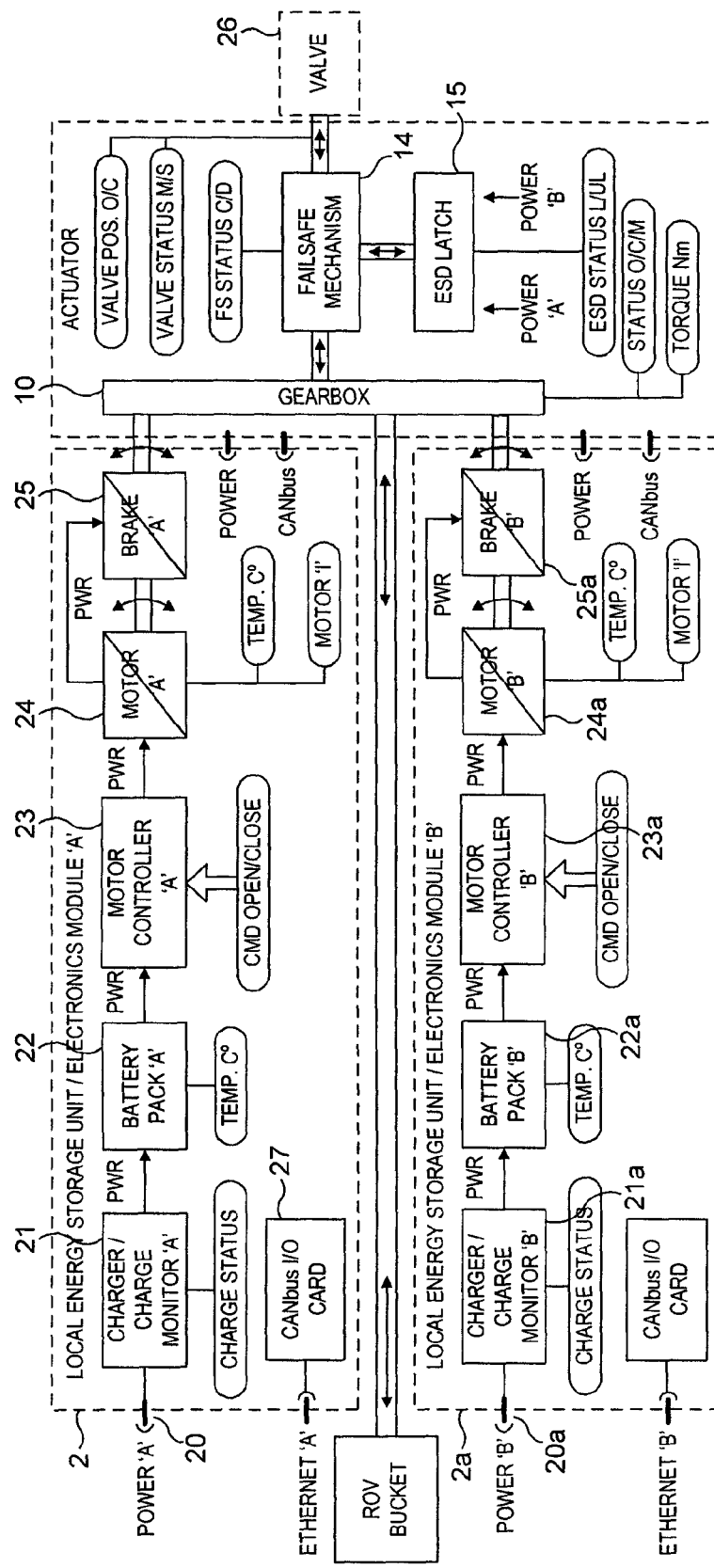
FIG. 2 is a schematic drawing of a system comprising an electrical supply and control system and the actuator shown in FIG. 1.

FIG. 2 illustrates schematically the arrangements for the supply and control of electrical power to the modules 2 and 2a and to the latch 15.

With reference to FIG. 2, the 'A' module 2 receives at a terminal 20 electrical power from (for example) a respective line in a subsea umbilical or marine electrical cable. This terminal is connected by way of a charger 21 to a battery pack 22 that supplies power to a motor controller 23 which controls a first motor 24 (which has a powered brake 25). The drive shaft 8 of the motor 24 is coupled, as described with reference to FIG. 1, to the gearbox (i.e. the gear train 10) connected as previously described to a valve 26. A fail-safe mechanism (i.e. spring 14) is shown schematically between the gearbox 10 and the valve 26 and the ESD latch 15 is shown schematically as controlling the fail-safe mechanism. The latch 15 can receive power from the 'A' module 2. The 'A' module 2 can receive and can send data by way of and (for example) Ethernet connection to a 'CAN bus' I/O card 27.

The 'B' module 2a is organised in a similar manner, corresponding parts being denoted by the suffix 'a'. FIG. 2 also indicates various instrumentation devices by the quantities or signals they provide or control, particularly a charge status and temperature of each battery, open and close commands to the controllers, temperature of the motor, the motor currents, the valve's position, the valve's status, the status of the fail-safe mechanism, the status of the ESD latch, the status of the gear box and the torque produced in the gearbox. The instrumentation is, of course, essential to operation of a practical actuator, but its particular organisation is not essential to the construction of the actuator and the latches and will not therefore be described further.

Introduction to the Latches

Each of the latches described in the following is intended to be capable of use as the ESD latch 15 in the context of the actuator shown in FIG. 1. They all have the common features that they require a continuous electrical power supply to maintain a latched state, in which the latch acts to decouple the action of the fail-safe mechanism on the electrical actuator, and to allow the reassertion of the action of the fail-safe mechanism when the supply fails either completely or sufficiently to release the latch. However, as indicated previously, each actuator is of novel construction and has utility in other contexts.

The Star Disc Latch

Figure 3:
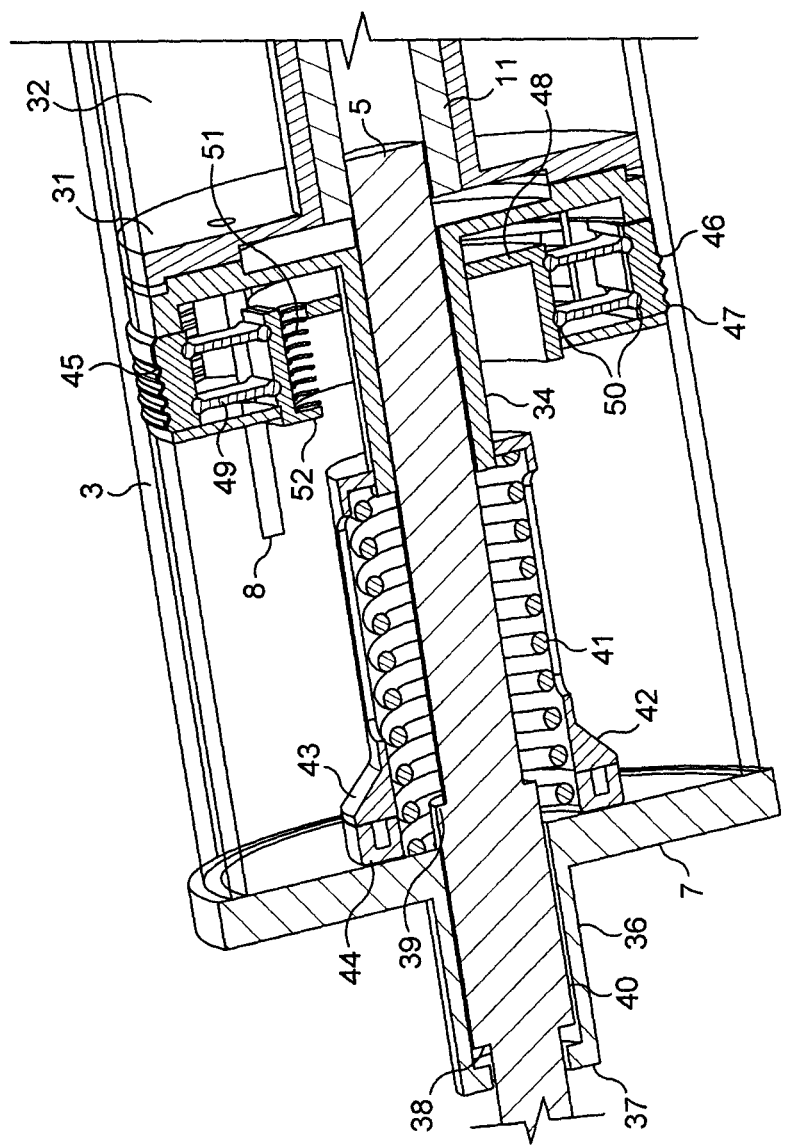
FIG. 3 is a drawing which illustrates one embodiment of an electromagnetic latch with adjacent parts of an actuator.

FIG. 3 is a schematic drawing of a latch which may be used in an actuator according to FIG. 1.

The purpose of the latch in that context is to maintain the return spring 14 of FIG. 1 in a tensed state but to decouple the action of the return spring on the actuator stem 5 so that for example the actuator can open and close the valve without having to work against the force of the spring. The latch may be released either by a failure in its power supply or by a command which deenergises the latch. The latch may also be employed in other actuators or more generally to maintain a moveable part in a predetermined position while in a latched state but to allow movement of the part from that position when in an unlatched state.

In this embodiment the latch is disposed within the enclosure 3 of the actuator. An end plate 31 of the drive unit previously described defines with the enclosure 3 a chamber 32 for the return spring 14 (not shown in this Figure).

The telescopic drive shaft 8, driven by a motor (as previously described) extends axially of the enclosure and into the drive unit which includes the roller nut 11 and the roller screw previously described. The roller nut 11 is disposed within a sleeve which extends axially from the endplate 31 of the drive unit.

The drive unit includes an inner sleeve 34. The stem 5 extends through this sleeve and through the left-hand endplate 7 of the enclosure 3. The end plate 7 has an axially extending socket 36 into which the stem 5 extends. The stem further extends through an end wall 37 of the socket 36. The stem is splined between two shoulders 38 and 39 which constitute end stops. The spline 40 engages the interior of the socket 36 so that the stem 5 (together with the integral roller screw) can move axially but does not rotate. The outer end stop 38 can abut the end 37 of the socket 36 to limit the movement of the stem 5 and the roller screw in the retracting direction, whereas the inner end stop 39 can engage the end of the sleeve 34.

A compression spring 41 is disposed within a hollow hammer 42 of which the end remote from the end plate 35 has an aperture which fits over and is guided by the sleeve 34. The hammer 42 has at its end nearer the end plate 7 a flange 43 which can abut an electromagnet 44 comprising a grooved ring of magnetic material, the ring including a coil (not shown) which normally is continuously energised so that the hammer 42 is held in position near the end plate 7 against the force of the spring 41. As will become apparent from further description herein, cessation or sufficient reduction of the energisation of the electromagnet will release the hammer 42 and will cause release of the latch.

The drive unit includes in its outer cylindrical part circumferentially spaced shoes 45 which are capable of radially inward movement. Each shoe has on its outside a set of serrations which can engage grooves 46 in the inside of the enclosure 3 as shown by the contact surface 47.

The drive unit is advanced against the force of the return spring by means of the motor which drives the shaft 8 to rotate the roller nut to produce axial movement of the drive unit when the outer end stop 38 abuts the end of the socket 36.

When the shape-lock shoes 45 reach the grooves 46, they can engage the grooves and thereby be prevented from rearward movement.

Within the drive unit is an inner member in the form of a ring 48, which extends axially outside the stem 5 and is mounted on the sleeve 34. This ring member 48 supports at its periphery a lever coupling which engages the shoes 45. In this example the coupling comprises two axially spaced sets of circumferentially spaced levers 49 which extend from bearing slots in the outside of the ring to the inside of the shoes. These levers have rounded ends which are received in part-circular grooves 50 on the outside of the ring 48 and the insides of the shoes 45.

Multiple reload springs (of which only one spring 51 is shown) extend between an inwardly directed rim 52 of the ring 48 and a wall of the drive unit. These springs hold the ring 48 in a position wherein the connecting levers 49 hold the shoes 45 in engagement with the grooves 46.

Figure 4:
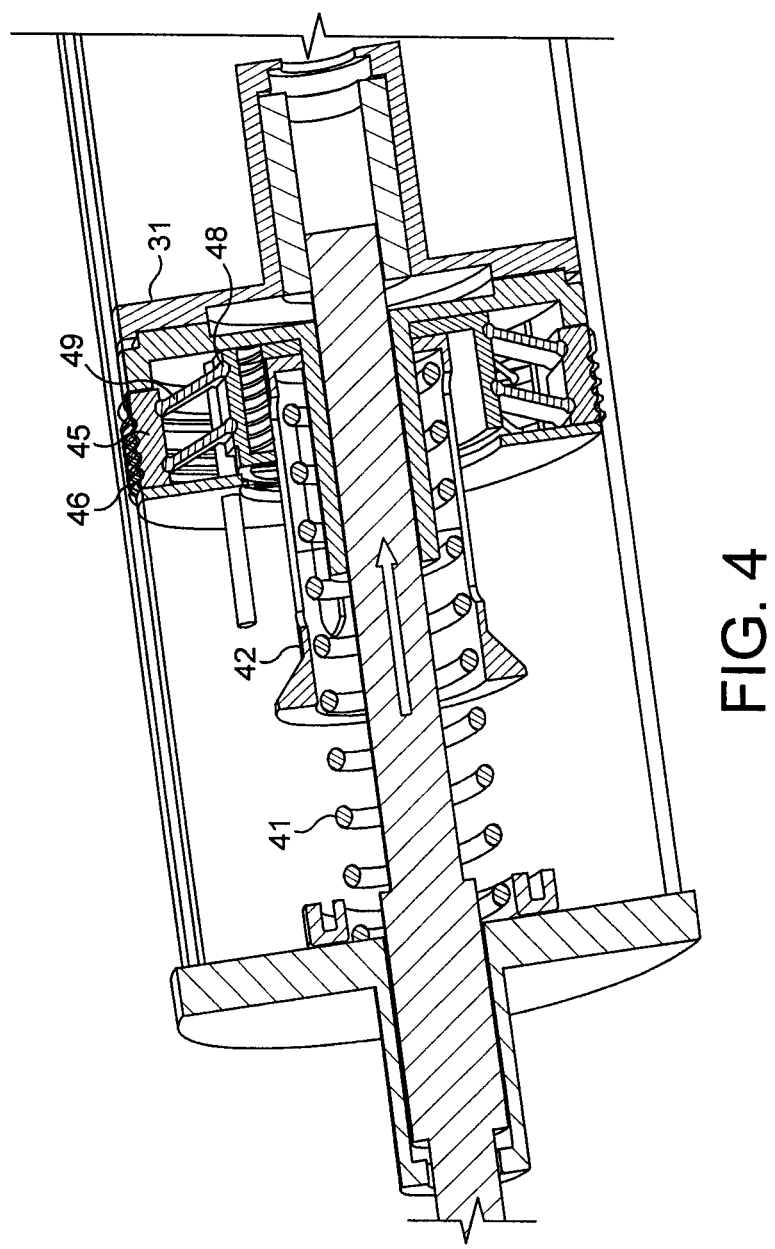
FIGS. 4 and 5 illustrate the latch shown in FIG. 3 in a different phase of operation.
Figure 5:
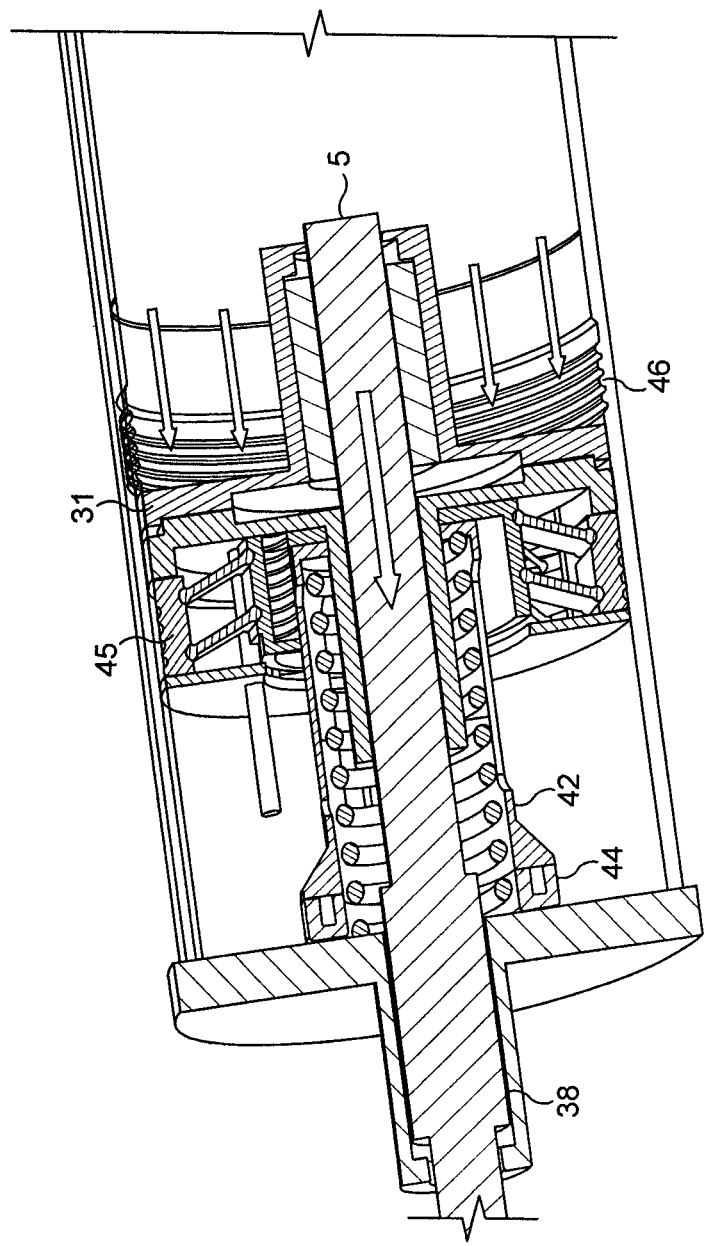

When the electromagnet 44 is de-energised the hammer's spring 41 propels the hammer 42 towards the ring 48. When the hammer impacts on the ring 48, as shown in FIG. 4, it causes the levers 49 to 'snap' through their dead-centre positions to withdraw the shoes 45 from the annular grooves 46. Since the shoes 45 are released, the fail-safe spring 14 can (as shown in FIG. 5) displace the drive unit and thereby the valve stem 5 until the valve is closed, the roller nut being prevented from rotation by the electromechanical brakes on each motor. The drive shaft 8 (and the drive shaft 8a) will axially contract to accommodate the displacement while maintaining continuity of the respective drive train.

Re-energising the electromagnet 44 will retain the hammer 42 in its energised 'ready' state. The advancement of the gear train and the associated components will eventually cause the shoes 45 to re-engage the grooves 46 to maintain the assembly in a latched state.

Roller Lock Latch

FIGS. 6 to 9 illustrate the construction and manner of operation of a latch which may be used in, and is illustrated in, the context of an actuator as described with reference to FIG. 1. The latch operates to maintain the drive unit comprising the gear train 10 and its casing 12 in position against the force of the spring and allows the roller nut (previously described) to advance and retract the valve stem 5 without expending energy in counteracting the force of the spring.

Figure 6:
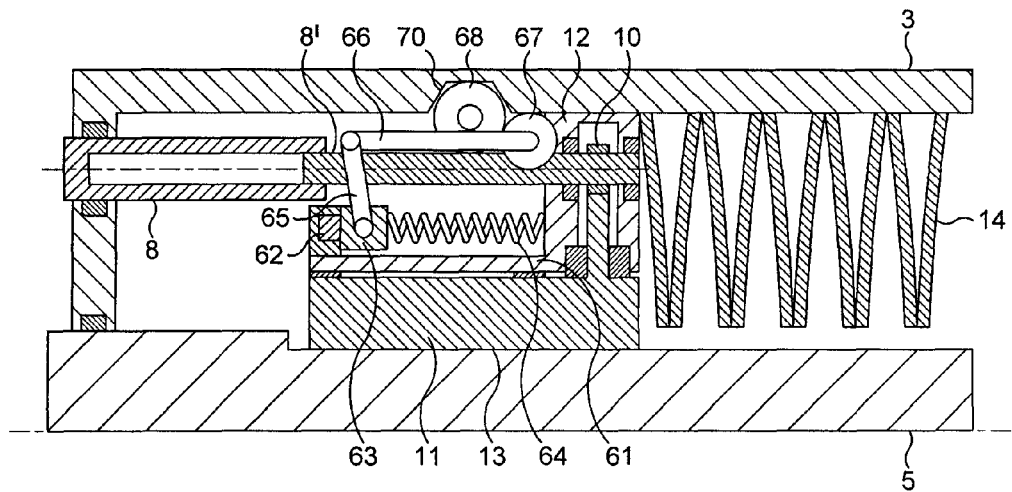
FIG. 6 is a schematic drawing which illustrates another embodiment of an electromagnetic latch with adjacent parts of an actuator.

In the construction shown in FIG. 6, the inner rod 8' of the telescopic drive shaft 8 extends through the gear train casing 12. It drives the gear train 10 as described with reference to FIG. 1 so as to rotate via a speed reduction the roller nut 11 which advances and retracts the roller screw 13 which is connected to the valve stem. The fail-safe spring 14 bears against the gear train casing 12.

The actuator is put in the state shown in FIG. 6 by rotation of the shaft 8 while a shoulder (not shown) on the left-hand end of the stem 5 engages an end stop to prevent leftwards movement of the stem, whereby the gear train casing 12 advances against the force of the spring 14.

Extending leftwards (in the sense shown in the drawing) from the gear train casing is a sleeve 61. On this sleeve is mounted an annular electromagnet 62. An armature 63 for the electromagnet is connected by a tension spring 64 to a wall of the gear train housing, so that if the energisation of the electromagnet 62 is sufficiently reduced, the armature 63 will move rapidly to the right in the axial direction of the stem 5.

The armature 63 has a pivot for a radial lever 65 which is pivotally connected to an axially extending lever 66 which is pivoted about an axis coincident with a roller 67 mounted in the casing 12. A roller 68 is carried on the axial lever 66. The rollers 67 and 68 are in rolling contact. The lever 66 is shown straight in FIGS. 7 and 8 but as shown in FIG. 9 the roller 68 is offset from a line connecting the pivot axes of the carrier lever 66.

The roller 68 can, when the lever 65 is substantially disposed in the axial direction, enter an annular recess 70 on the inside of the actuator enclosure 3. In this state of the mechanism, the force of the spring 14 is transmitted to the enclosure 3, provided that the line of action of force from the roller 67 to the roller 68 has an outward component.

Figure 7:
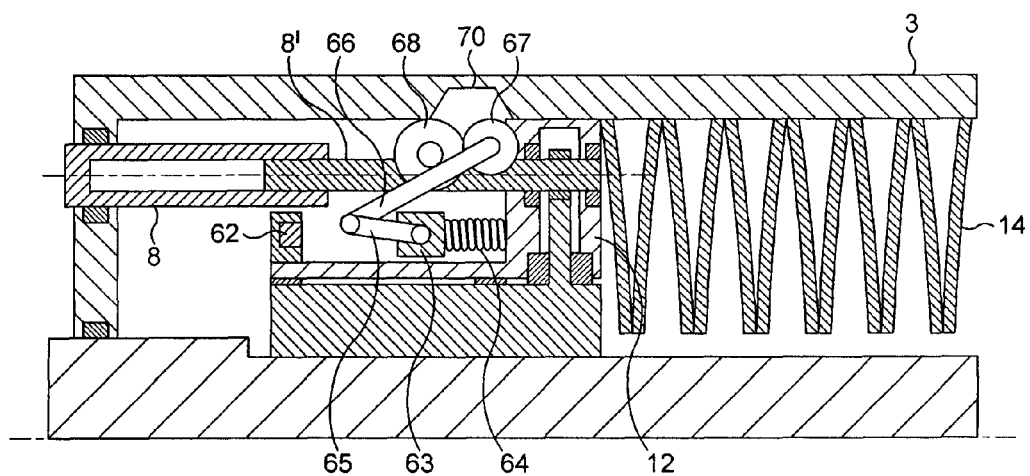
FIGS. 7 and 8 illustrate the latch shown in FIG. 6 in various phases of operation.

FIG. 7 illustrates the actuator and latch when the electromagnet 62 has been de-energised. The levers 65 and 66 have rotated so as to allow the roller 68 to roll out of the annular recess 70. Then the gear train casing 12 is free to move and the fail-safe spring 14 is released to move the gear train housing 12 and the associated components leftwards.

Figure 8:
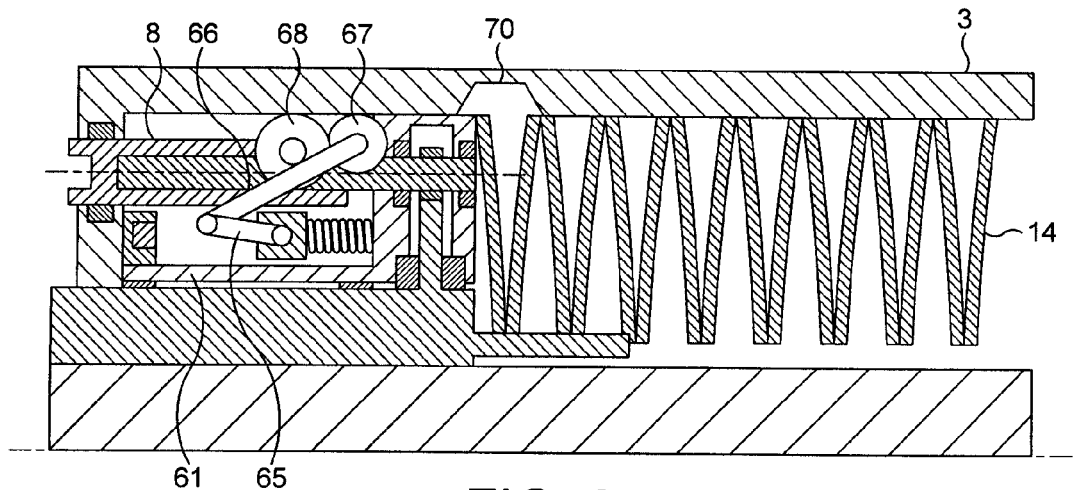
Figure 9:
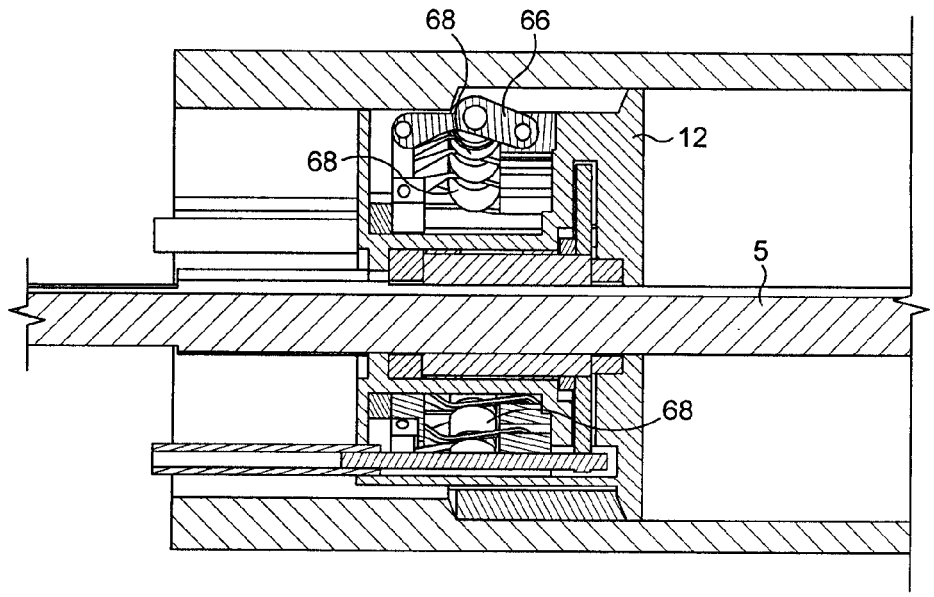
FIG. 9 is another illustration of the latch shown in FIG. 6.

FIG. 8 shows the mechanism when the spring 14 has moved the drive unit until the sleeve 61 abuts the end plate 36 of the enclosure 3.

In a practical embodiment, there are several mechanisms as described, disposed in parallel, each with respective rollers 67 and 68, spaced around the enclosure 3. This is illustrated in the perspective view shown in FIG. 9, which indicates several of the rollers 68.

PSC Latch

Figure 10:
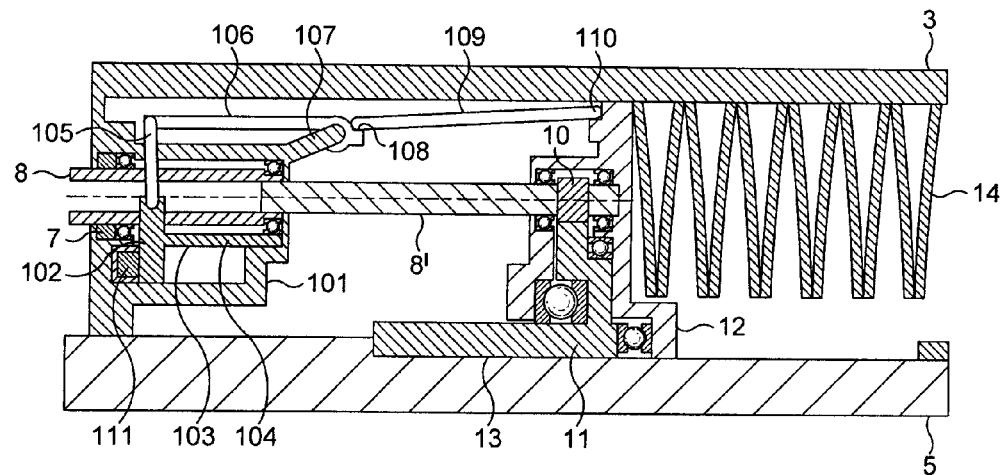
FIG. 10 is a schematic drawing which illustrates another embodiment of an electromagnetic latch with adjacent parts of an actuator.

FIG. 10 illustrates in context another embodiment of a latch which is primarily intended for use in an actuator as described with reference to FIG. 1 but may have other uses.

The inner rod 8' of the telescopic drive shaft 8 extends into the gear train casing 12. It drives the gear train 10 and thereby the roller nut 11 which engages the roller screw 13 on the stem 5 as previously described. The fail-safe spring 14 bears against the gear train casing 12.

Figure 13:
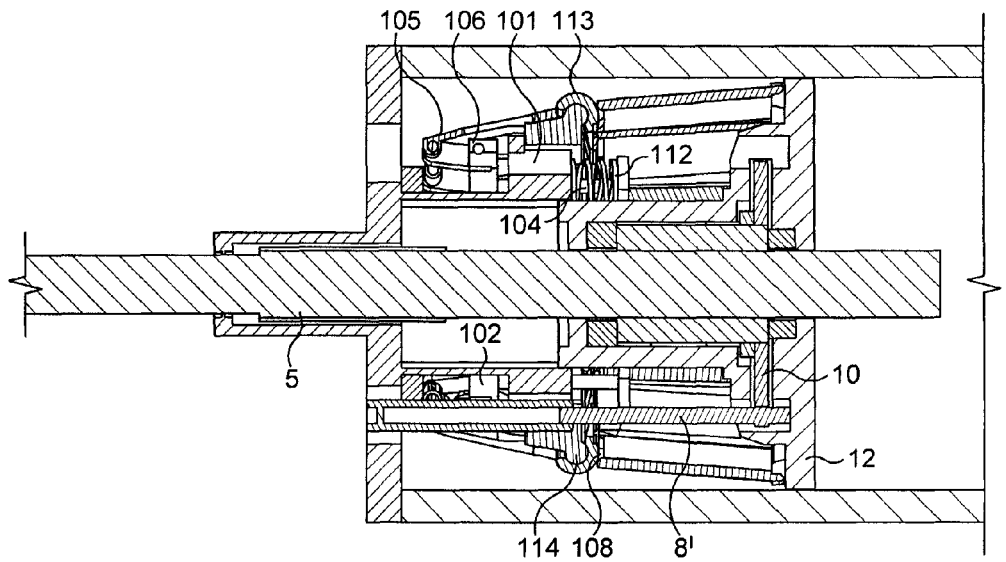
FIG. 13 is another illustration of the latch shown in FIG. 10.

FIG. 10 is schematic and for simplicity shows only one latch mechanism. As is indicated in FIG. 13, there are preferably multiple parallel mechanisms spaced around the central axis of the actuator.

The end plate 7 of the actuator enclosure 3 carries an annular frame 101 in which is movable, in the axial direction, an annular plate 102. Reset pistons 103 (only one being shown in FIG. 10) extend rearwardly of the plate 102. The pistons are spaced around the plate. Each piston carries a reset spring 104 (see FIG. 13).

Each mechanism comprises a 'radial' lever 105 which is pivoted to the plate 102 and in the position shown in FIG. 10 extends radially outwardly. To the distal end of the radial lever 105 is pivoted a respective pivot arm 106 which is also pivoted to a respective attachment arm 107 extending obliquely forwards of the frame 101.

The end of the pivot arm 106 defines a shoulder 108 in which is located the distal end of a respective 'snap' rod 109 extending to a pivot 110 on the gear train casing.

The plate 102 is held against the force of the reset springs by means of an electromagnet 111 disposed on the end plate 7.

As is shown in FIG. 13, each reset spring 104 is disposed between the head 112 of the respective piston 103 and a datum surface within the frame 101. The plate 102 is urged away from the endplate 7 by the reset springs and will therefore move to the right in the drawing when the electromagnet 111 is de-energised.

The mechanism reaches the condition shown in FIG. 10 when the gear train housing has been driven sufficiently far for the end of the snap rod 109 to locate in the shoulder 108. At that point the force of the return spring 14 is supported by the rod 109 and thereby via the arm 107 on the frame 101.

Figure 11:
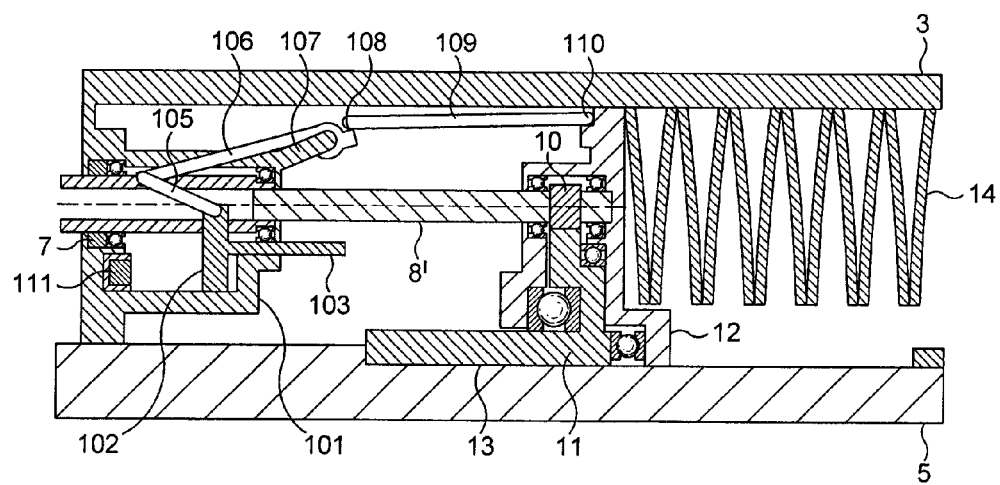
FIGS. 11 and 12 illustrate the latch shown in FIG. 10 in various phases of operation.

The latch can be released by cessation of the power supply to the electromagnet 111. Thereupon the plate 102 is rapidly drawn away by the reset springs 104. This action rotates each radial lever 105 and thereby the pivot arms 106 to displace the distal ends of the snap rods 109 from the shoulders 108 as shown in FIG. 11.

Figure 12:
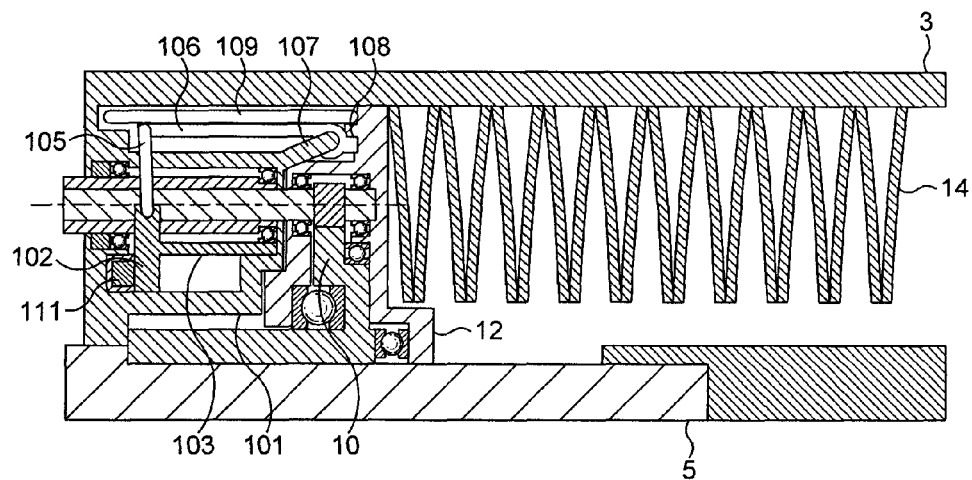

The fail-safe spring 14 is now released and forces the gear train casing and the stem 5 rearwards, collapsing the latch mechanisms to the state shown in FIG. 12. In this state each rod 109 is disposed alongside the respective arm 106 and the plate 102 has been pushed into proximity with the electromagnet 111 because the gear train casing has engaged the heads of the pistons 103.

FIG. 13 also shows in more detail that the end of each pivot arm 106 has an arcuate end 113 around a boss 114 formed on the respective attachment arm 107.

Pure Roller Latch

Figure 14:
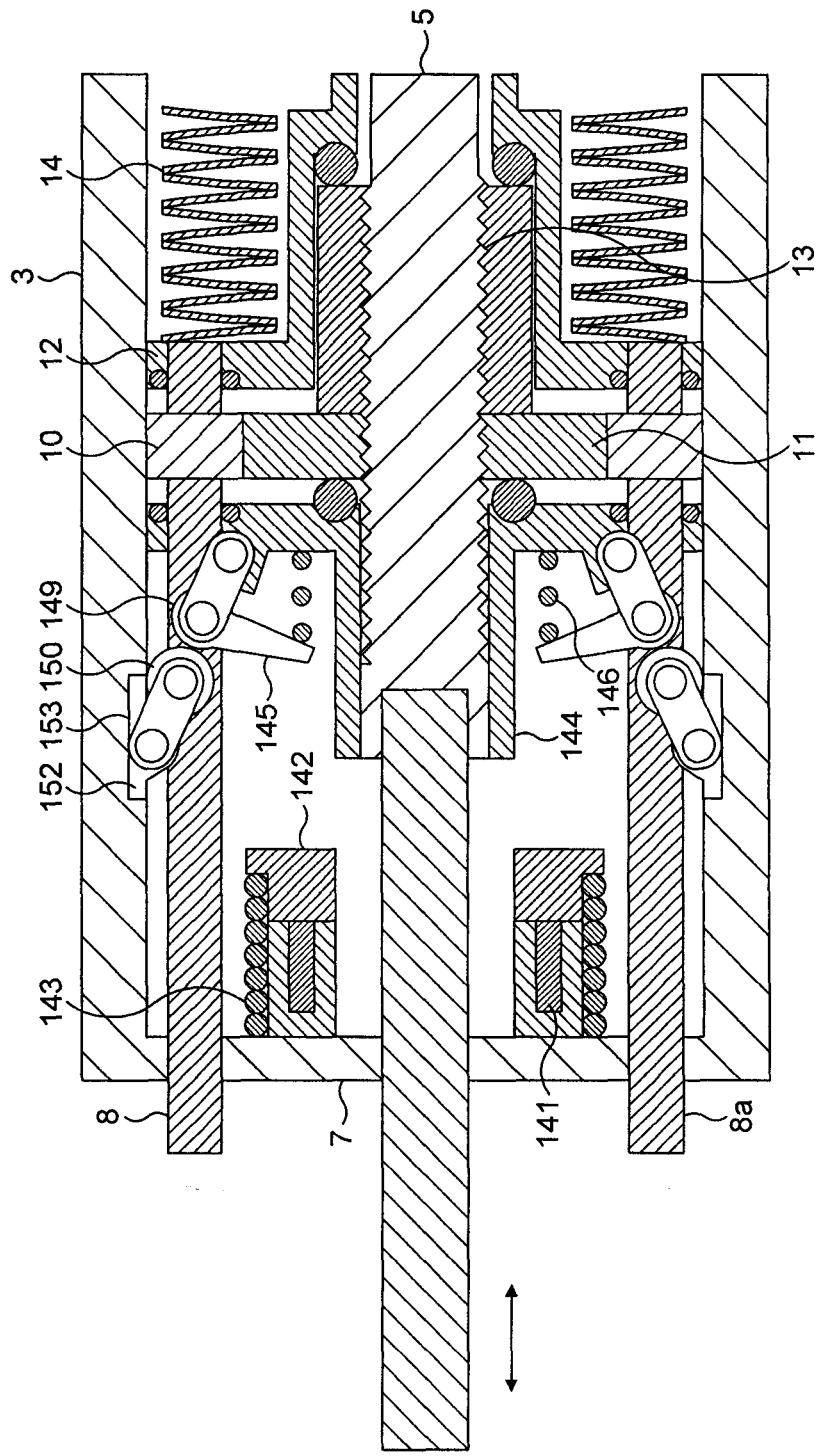
FIG. 14 is a schematic drawing which illustrates another embodiment of an electromagnetic latch with adjacent parts of an actuator.

FIG. 14 illustrates the relevant parts of the actuator and a roller latch which can maintain the gear train casing 12 in position against the force of the fail-safe spring 14 and allow the gear train 10 to transmit drive to the roller nut 11 and thence to the roller screw 13 and the stem 5 as previously described. The drive may be transmitted through either of the telescopic drive shafts 8 and 8a.

On the end plate 7 of the actuator enclosure 3 remote from the fail-safe spring 14 is an annular electromagnet 141. While the electromagnet is sufficiently energised it holds an annular hammer 142 against the force of a compression spring 143 disposed between the end plate 7 and a rim of the hammer 142.

The latch in this embodiment preferably has a multiplicity of sets of latching rollers (shown in FIG. 18), the sets being spaced apart around a sleeve 144 which extends axially of the gear train housing towards the end plate 7 and covers part of the roller screw 13.

Two of the sets of rollers are shown in FIG. 14, but for convenience only one will be described in detail.

Figure 17:
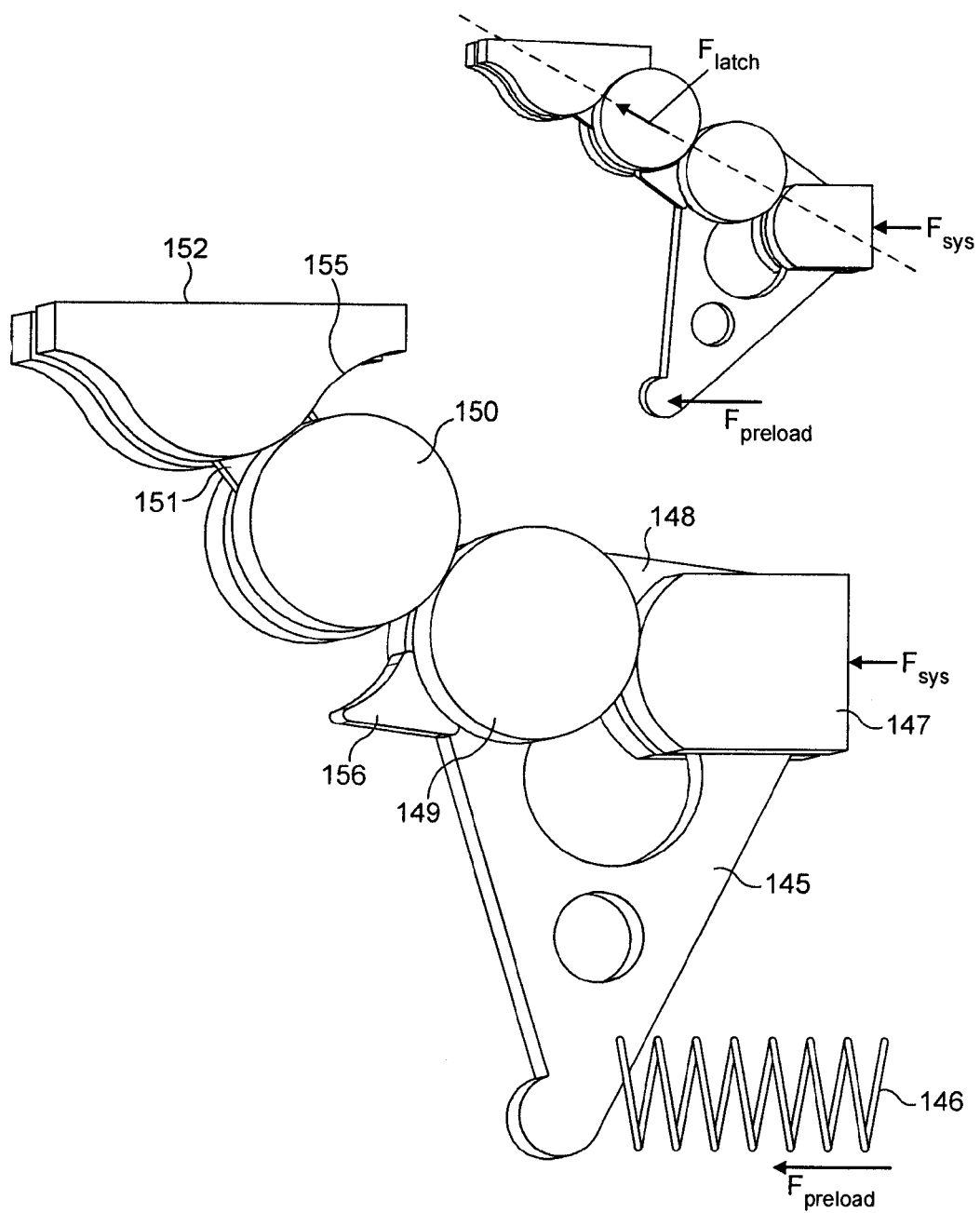
FIG. 17 is drawing which illustrates various details of the latch in FIG. 14.

With reference to FIGS. 14 and 17, pivoted to the gear train housing is a bracket 145 which extends inwardly towards the stem 5. At its end the bracket is engaged by a compression spring 146 which urges the bracket away from the axis of the stem 5. The bracket also forms the striker plate for the hammer 142 when that is released. The bracket 148 can rotate in a slot in a support 147 which has a curved roller surface 148 in rolling contact with a roller 149 mounted for rotation on the bracket 145. The roller 149 is in rolling contact with a roller 150 carried on an arm 151 pivotally mounted within a seat 152 fixed in the side wall 153 of the actuator enclosure 3. The seat has a rim on which the roller 149 makes rolling contact. The seat limits the movement of the arm 151, in particular by means of a shallow cup 155 which can receive the roller 150.

The bracket includes a latch guide 156, which can extend between the two halves of the roller 150 to engage the end of the arm 151 so that under the influence of the spring 146 the rotation of the bracket away from the axis causes the rollers 149 and 150 to be in a slightly over-centre position, whereby the force of the spring 14 is transmitted through the support 147 and the rollers 149 and 150 to be sustained by the seat 152 and therefore by the enclosure 3.

Figure 15:
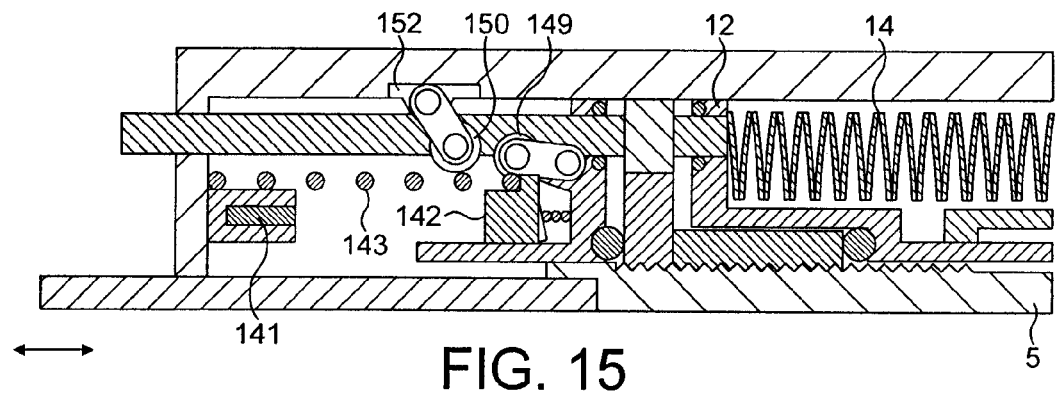
FIGS. 15 and 16 illustrate the latch of FIG. 14 in various phases of operation.
Figure 16:
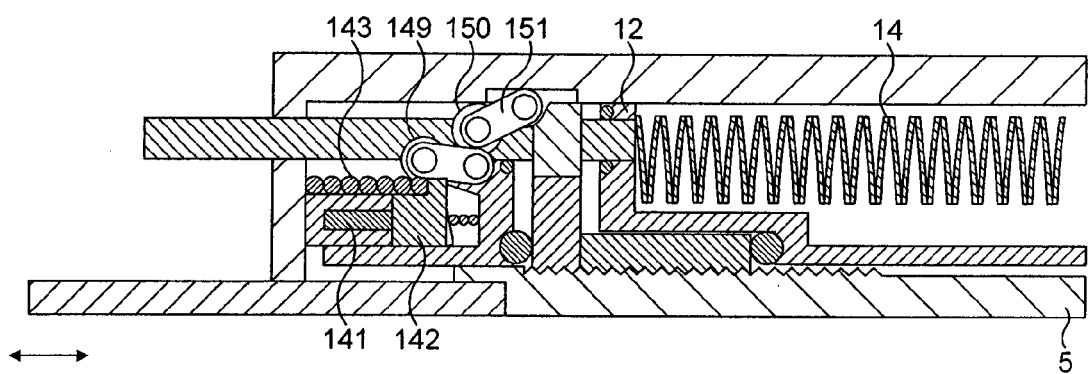

On deenergisation of the electromagnet 141, the hammer 142 is released and is driven by the spring 143 to strike the bracket 145. On impact the bracket rotates in a sense towards the axis of the stem 5. The roller 149 rolls around the roller 150 though a dead-centre position and the latch is released (FIG. 15), freeing the fail-safe spring 14 to displace the drive unit and the stem 5. The mechanism can be driven back to the state shown in FIG. 16, wherein the hammer 142 has been moved back to the electromagnet 141 while the hammer's spring 143 is re-compressed. Re-energisation of the electromagnet will retain the hammer in its 'charged' state. A command to one or other of the drive motors enables the gear train and roller screw assembly to recharge the fail-safe spring and to cause the actuator to reach the state shown in FIG. 14. An advantage of this embodiment is that the latching and release actions are pure rolling actions, reducing friction or the risk of damage.

Figure 18:
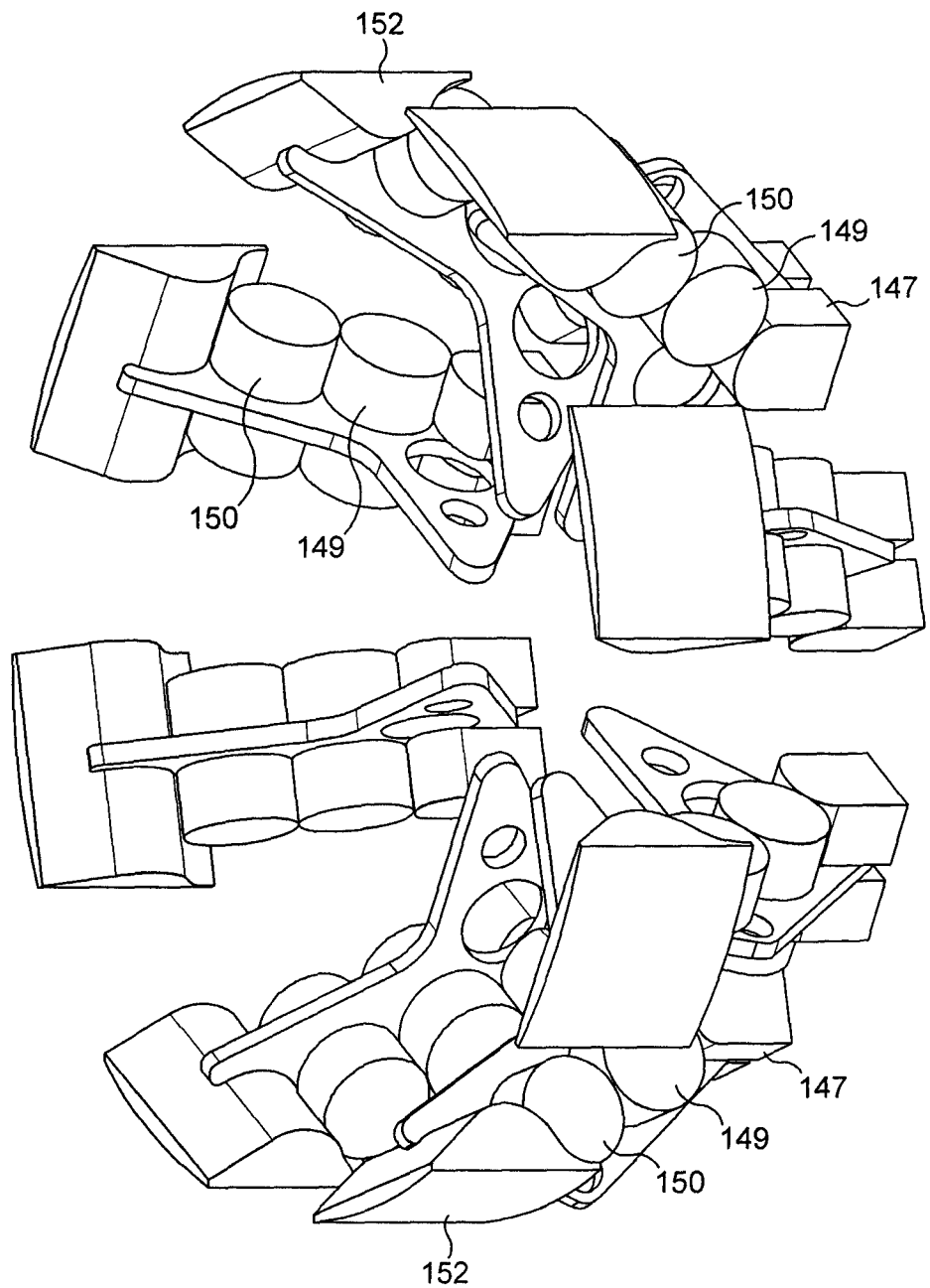
FIG. 18 is a drawing showing a preferred form of the latch of FIG. 14.

As is shown in FIG. 18, there are multiple sets of brackets 145, rollers 149, 150 and seats 152 spaced circumferentially about a central axis through the stem 5.

What is claimed is:

1. A subsea actuator comprising:
   first and second electric motors;
   an operating member;
   a drive unit;
   a return spring operable on said drive unit to urge said operating member towards a datum state; and
   a latch which is operative when set to maintain said drive unit in a predetermined position so as to decouple the action of said return spring, whereby the operating member can be advanced and retracted relative to the drive unit free from the action of said return spring, and is operative on release to allow said return spring to operate on said drive unit to return said operating member to said datum state;
   said first and second electric motors being coupled for energisation by a respective electrical energy store, said first motor having a first telescopic drive connection to said drive unit, and said second motor having a second telescopic drive connection to said drive unit, said drive unit being thereby configured for driving by either of said motors, said drive unit being configured for movement to and fro and to convert rotary motion of either of said first and second telescopic connections to linear motion of said operating member;
   wherein said latch comprises:
   a bracket pivoted to said drive unit, the bracket carrying a first roller;
   an arm pivoted to a fixed position and carrying a second roller for engagement with said first roller;
   means for biasing said bracket to an angular position wherein a force of said return spring on said drive unit is transmitted to said fixed member when said drive unit is in the predetermined position; and
   a hammer which is disposed to be held against the force of an operating spring by an electromagnet and is moveable by said operating spring on de-energisation of the electromagnet to strike said bracket to rotate said bracket, the rotation of said bracket causing relative rolling movement of said rollers and disengagement thereof.

2. The actuator of claim 1 in which said drive unit includes reduction gearing.

3. The actuator of claim 1 in which said drive unit comprises a drive nut on a roller screw connected to said operating member.

4. The actuator of claim 3 and further comprising means for preventing rotation of said roller screw and said operating member.

5. The actuator of claim 1 in which said latch is adapted to be put into a set state latching said return spring on movement of said drive unit to the predetermined position against the force of said return spring.

6. The subsea electric actuator of claim 1 wherein:
   a screw is disposed for axial movement without rotation and is connected to said operating member;
   a drive nut is disposed on said screw; and
   the drive unit includes reduction gearing and can move to and fro and is configured to couple rotary motion of said first drive connection and said second drive connection via said reduction gearing to said drive nut.

7. The actuator of claim 6, wherein said first and second electric motors are coupled for energisation by respective electrical energy stores.

8. The actuator of claim 6 wherein said drive unit can drive said nut to move said operating member.

9. The actuator of claim 1 in which said hammer is disposed for recapture by said electromagnet in response to movement of said drive unit towards said datum state.

10. The actuator of claim 1 and including means for limiting the movement of the arm in a sense opposite the direction of said rotation.

11. The actuator of claim 1 in which there is a multiplicity of sets of said rollers spaced apart around said operating member.

* * * * *